United States Patent
Cheong et al.

(10) Patent No.: US 7,032,231 B2
(45) Date of Patent: Apr. 18, 2006

(54) OPTICAL PICKUP DEVICE

(75) Inventors: Young-min Cheong, Seoul (KR);
Kwang Kim, Gyeonggi-do (KR);
Jin-won Lee, Gyeonggi-do (KR);
Tetsuo Ando, Gyeonggi-do (KR);
Kyung-sik Shin, Gyeonggi-do (KR);
Su-ho Shin, Gyeonggi-do (KR);
Young-Bin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 10/622,741

(22) Filed: Jul. 21, 2003

(65) Prior Publication Data
US 2004/0062183 A1    Apr. 1, 2004

(30) Foreign Application Priority Data
Sep. 26, 2002    (KR) ..................... 10-2002-0058461

(51) Int. Cl.
*G11B 7/085*    (2006.01)
(52) U.S. Cl. .................................. 720/683
(58) Field of Classification Search ............. 720/683, 720/681, 685; 369/244.1, 247.1
See application file for complete search history.

(56) References Cited

U.S. PATENT DOCUMENTS 5,673,152 A * 9/1997 Yokota et al. ............... 359/813
6,781,926 B1 * 8/2004 Ishizaki et al. .......... 369/13.13

FOREIGN PATENT DOCUMENTS

| JP | 2000-11440 | * | 1/2000 |
| JP | 2000-331359 | * | 11/2000 |
| JP | 2002-63724 | * | 2/2002 |
| JP | 02002063724 A | * | 2/2002 |

* cited by examiner

*Primary Examiner*—Allen Cao
(74) *Attorney, Agent, or Firm*—Stein, McEwen & Bui, LLP

(57) ABSTRACT

An optical pickup having a blade including a first blade in which an objective lens is mounted and which is made of a reinforced plastics material, and a second blade in which driving coils are mounted and which is made of a magnesium alloy material. Since the first blade has a low thermal conductivity coefficient, the heat generated in the coils is prevented from being transferred to the objective lens, whereas the second blade having a high thermal conductivity coefficient radiates the heat generated by the coils to the outside. Thus, the heat distortion of the objective lens can be suppressed, and damages to the coils or rigidity reduction of the blade can be avoided.

8 Claims, 6 Drawing Sheets

OPTICAL PICKUP DEVICE

CROSS-REFERENCE TO RELATED APPLICATIONS

This application claims the priority of Korean Patent Application No. 2002-58461 filed on Sep. 26, 2002, in the Korean Intellectual Property Office, the disclosure of which is incorporated herein in its entirety by reference.

BACKGROUND OF THE INVENTION

1. Field of the Invention

The present invention relates to an optical pickup device, and more particularly, to an optical pickup device having a heat radiation structure.

2. Description of the Related Art

Generally, disk drives, such as compact disk players (CDPS) or digital versatile disk players (DVDPs), use an optical pickup device to record and/or reproduce information on/from a disk by moving along a radius direction of the disk, irradiating a light beam on the disk, and receiving a light beam reflected from the disk. The optical pickup device, as shown in FIG. 1, includes a base 17 in which an optical system (not shown) is built, a blade 12 which is movably supported by a plurality of wires 16 having first ends which are fixed to a holder 13 on the base 17 and second ends which are fixed to the blade 12, an objective lens 11 mounted in the blade 12, focusing coils 14 and tracking coils 15 which are installed on the blade 12 and form an electrical path to move the objective lens 11 along a focusing direction A and a tracking direction B, magnets 19 which generate an electromagnetic force due to currents flowing through the focusing coils 14 and the tracking coils 15 (elements 14 and 15 also being referred to as driving coils) to drive the blade 12, and yokes 18a and 18b. Thus, if the recording and reproduction job of the information begins to be processed, the light beam emitted from the optical system is focused by the objective lens 11 and is irradiated on a recording surface of a disk (not shown). At this time, a current to control a position of the objective lens 11 to focus the light beam is supplied to the driving coils 14 and 15 in order to irradiate the light beam onto a correct position of the recording surface, thereby driving the blade 12.

However, when the above optical pickup device is operated, heat of about 70–80° C. is generated in the focusing coils 14 and the tracking coils 15. If the heat thus generated is not well radiated, the heat is transferred to the blade 12 and the objective lens 11, etc., and as a result, heat distortion of the objective lens 11 or the rigidity reduction of the blade 12 is generated. This could severely affect reproducing capacity of the optical pickup device. As a first measure for solving the above problem, the optical pickup device shown in FIG. 1 has a heat radiating wrinkle on a cover 10 to enlarge a surface area to radiate heat. However, since the cover 10 provided with the heat radiating wrinkle directly contacts only the base 17 and does not contact the blade 12 and the driving coils 14 and 15, the heat generated from the driving coils 14 and 15 is transferred to the cover 10 by only air. Although the heat radiating area of the cover 10 is enlarged, the heat radiation efficiency of the heat generated from the driving coils 14 and 15 decreases, and therefore, it is very difficult to prevent the heat from being transferred to the objective lens 11.

As a second measure, a separate heat radiating fan is installed in the optical pickup device to cool the heat generated from the coils. However, since a heat sensor to sense overheating, the heat radiating fan to generate a wind (air flow), and a motor must be installed separately in the optical pickup device, the structure of the optical pickup device is complicated while the size thereof is large. That is, the optical pickup device which must have the separate heat radiating fan and the motor, etc., has a great drawback on a design while the recent trend demands a small-sized and light-weight disk driver. Particularly, in a case of adopting the optical pickup device to portable devices such as a notebook computer, the separate motor is a direct component that leads to fast battery consumption of the portable device.

As a third measure, as shown in FIG. 2, a heat radiating member 23 is adhered to a blade 21 provided with an objective lens 20 and coils 22 so that heat generated in the coils 22 is easily radiated by the heat radiating member 23. While the radiation efficiency is slightly increased in the heat radiation structure proposed above, the heat generated in the coils 22 cannot be prevented from being directly transferred to the objective lens 20. That is, since only part of the heat which has been already transferred to the objective lens 20 through the blade 21 is radiated by the heat radiating member 23, the heat radiating member 23 slightly contributes to suppress the heat distortion of the objective lens 20.

SUMMARY OF THE INVENTION

It is an aspect of the present invention to provide an improved optical pickup device capable of efficiently preventing heat generated in driving coils from being transferred to an objective lens, and rapidly radiating the heat without adding a separate driving device for cooling such as a heat radiating fan or a heat radiating motor.

Additional aspects and advantages of the invention will be set forth in part in the description which follows and, in part, will be obvious from the description, or may be learned by practice of the invention.

The foregoing and/or other aspects of the present invention are achieved by providing an optical pickup device comprising a blade in which an objective lens is mounted; a plurality of wires to elastically and movably support the blade with respect to a holder formed on a base; driving coils which are installed in the blade and form an electrical path to move the objective lens along a focusing direction and a tracking direction; and a magnet which is installed in the base and generates an electromagnetic force due to currents flowing through the driving coils in order to move the objective lens. The blade includes a first blade in which the objective lens is mounted, and a second blade portion in which the driving coils are mounted. The first blade portion has a thermal conductivity coefficient lower than the second blade portion.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE INVENTION

Figure 1:
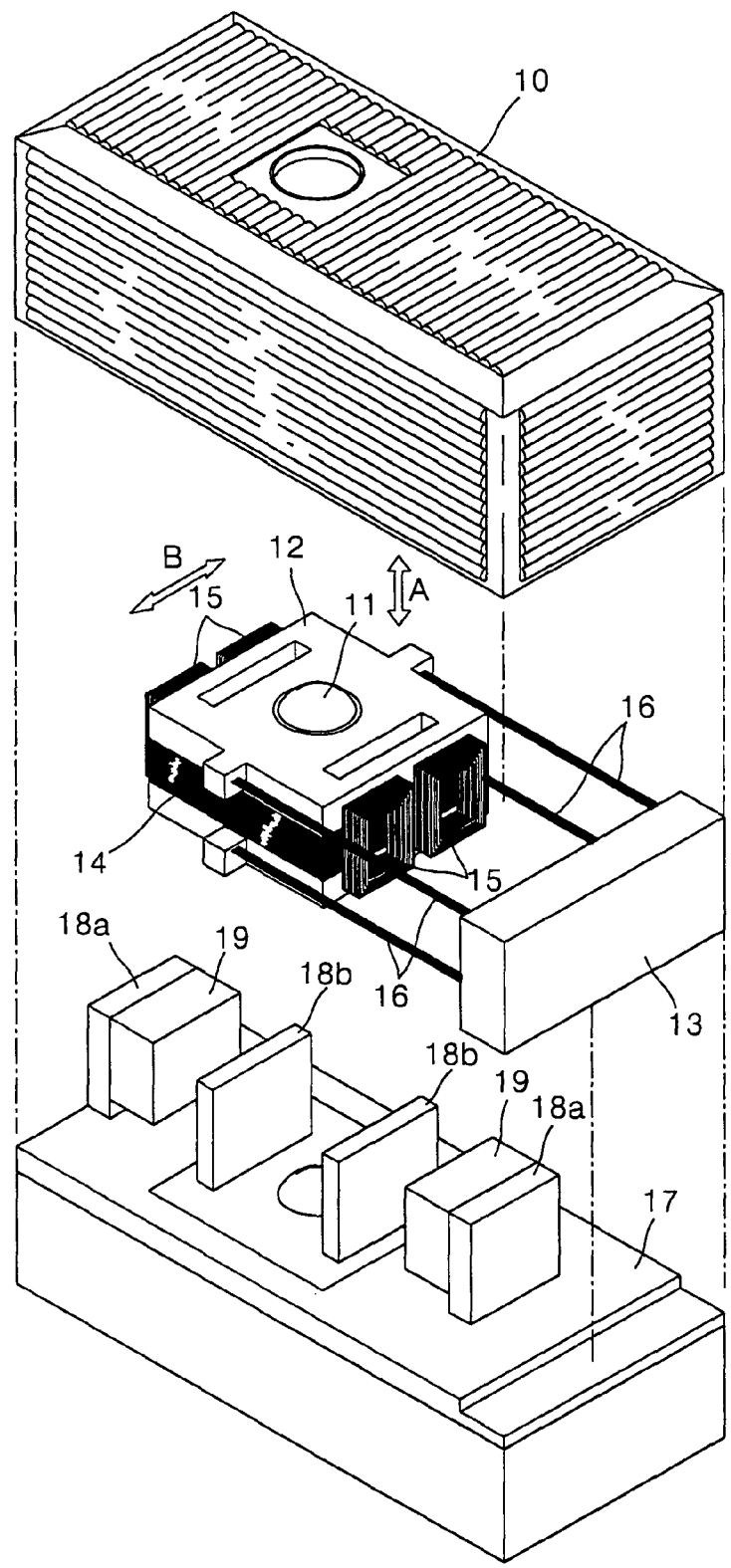
FIGS. 1 and 2 are views showing a conventional optical pickup device.
Figure 2:
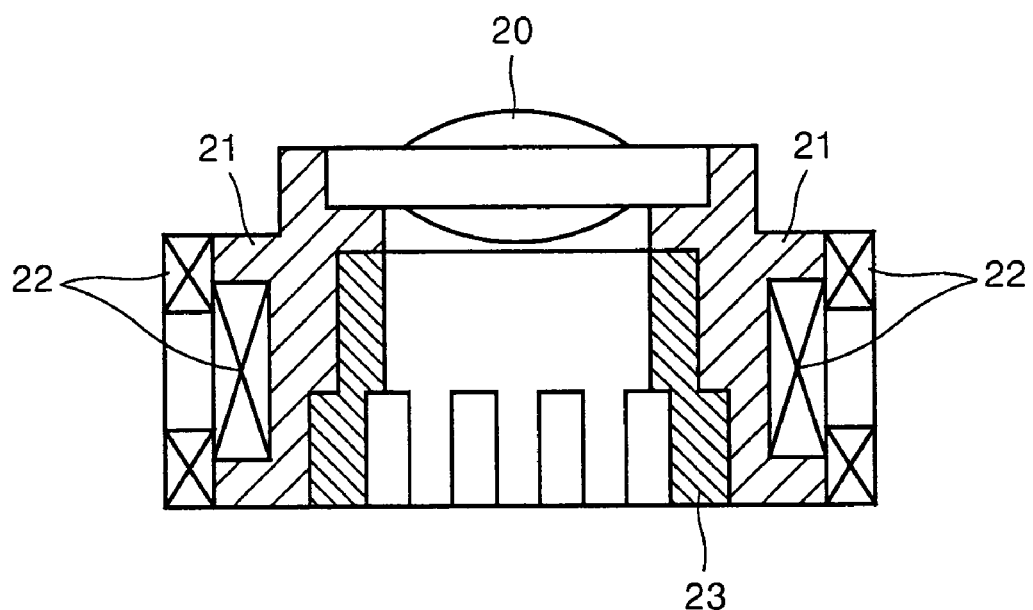

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
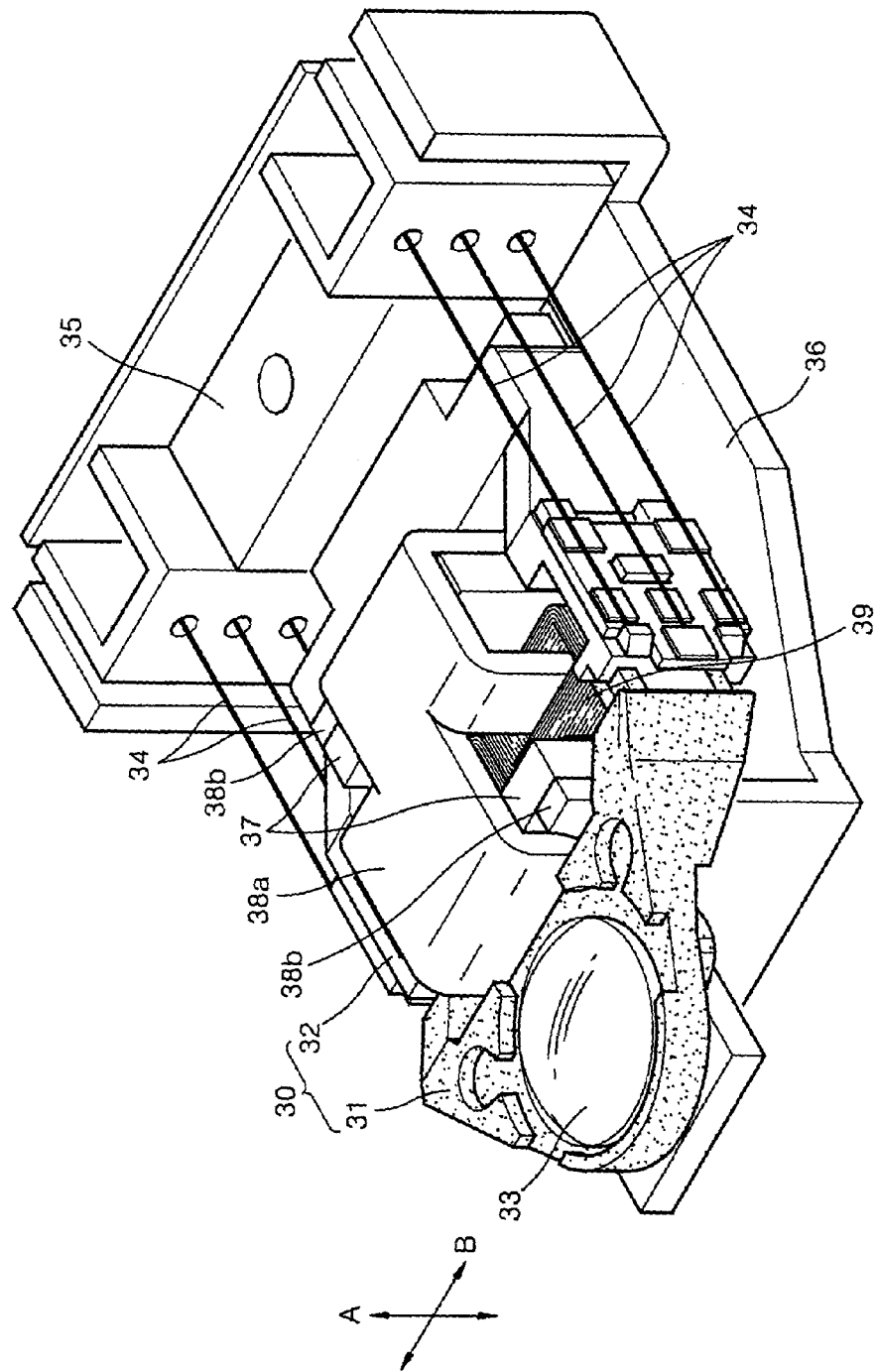
FIG. 3 is a view showing an optical pickup device according to the present invention.

As shown in FIG. 3, an optical pickup device according to the present invention includes a blade 30 in which an objective lens 33 is mounted, a plurality of wires 34 to movably support the blade 30 with respect to a holder 35 on a base 36, driving coils 39 as an electromagnetic driving unit to drive the blade 30 along a focusing direction A and a tracking direction B, and a magnet 37. Thus, the blade 30 supported by the wires 34 moves to a desirable position by supplying a current to the driving coils 39 and thus generating an electromagnetic force due to the magnet 37. Reference numerals 38a and 38b represent an inside yoke and an outside yoke to collect magnetic flux lines, respectively.

Figure 4:
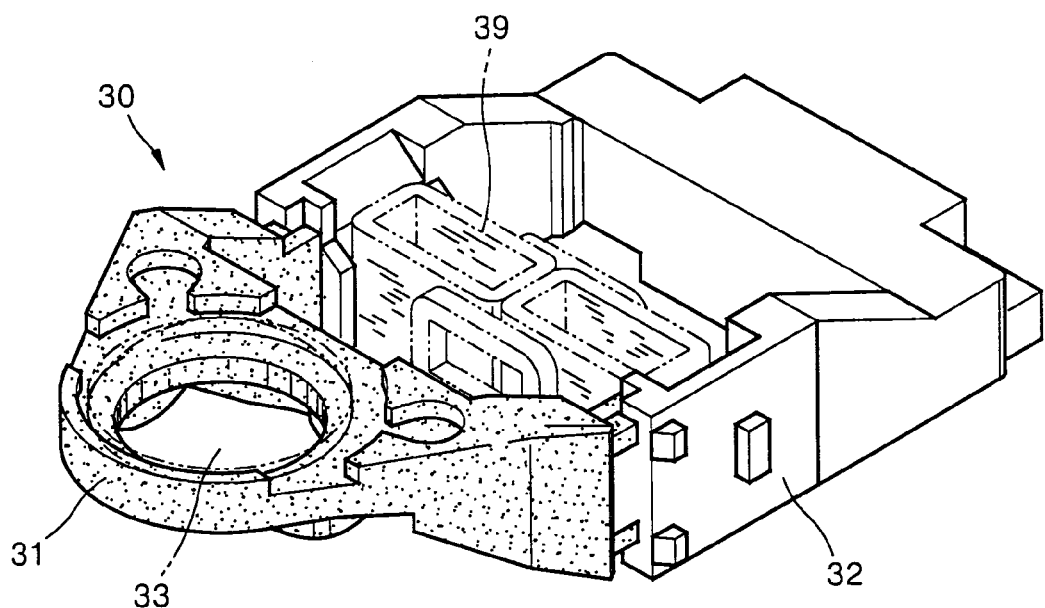
FIG. 4 is a view showing a blade included in the optical pickup device shown in FIG. 3.
Figure 6:
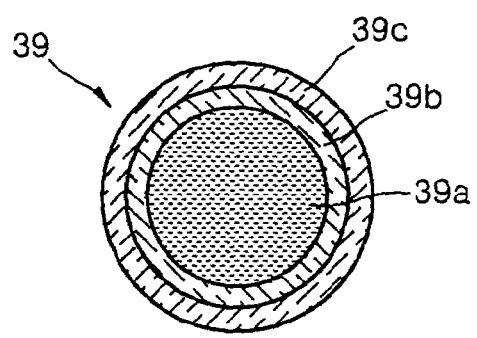
FIG. 6 is a cross-sectional view of driving coils included in the optical pickup device shown in FIG. 3.

The blade 30, as shown in FIGS. 3 and 4, includes a first blade portion 31 and a second blade portion 32 respectively made of different materials. The objective lens 33 is mounted in the first blade portion 31, and the driving coils 39 are mounted in the second blade portion 32. The above structure of the blade 30 prevents the heat generated in the driving coils 39 from being transferred to the objective lens 33, and the heat is well radiated to the outside without remaining within the blade 30. For example, if the blade 30 is made of a material having a high thermal conductivity coefficient, the heat generated in the driving coils 39 is transferred to the objective lens 33 so that a heat distortion of the objective lens 33 may appear. In contrast, if the blade 30 is made of a material having a low thermal conductivity coefficient, the heat generated in the driving coils 39 is prevented from being transferred to the objective lens 33. However, since the heat generated by the driving coils 39 remains in the blade 30 for a very long time, the driving coils 39 may become damaged or other problems may be caused by the overheated blade 30. A driving coil 39, as shown in FIG. 6, includes a wire 39a to flow a current, an insulating film 39b surrounding the wire 39a, and a self-bonding film 39c to contact the adjacent coil. As such, if the heat generated by the driving coils 39 is not efficiently radiated so that the driving coils 39 are in an overheated state, the self-bonding film 39c is broken and the regularly wound coils become loose. More seriously, the insulating film 39b is also broken so that the coils 39 may not act as driving coils anymore. Further, if the temperature of the blade 30 rises, the Young's modulus of the blade 30 is reduced. In this case, a second resonant frequency of the optical pickup device is moved to a low frequency band capable of overlapping with a servo control area of the blade 30 so that it may adversely affect the control of the blade 30.

Accordingly, in order to solve the above-described problems of the blade 30, the present invention provides the hybrid type blade 30 integrally combining the first blade portion 31 and the second blade portion 32, which are made of two materials having noticeably different thermal conductivity coefficients.

For this reason, the first blade portion 31, in which the objective lens 33 is mounted, is made of a reinforced plastic material having a low thermal conductivity coefficient, and the second blade portion 32, in which the driving coils 39 are mounted, is made of a metal material having a high thermal conductivity coefficient. A vectra material adding a glass fiber of about 30% is preferably used as the reinforced plastic material, and a light-weight magnesium alloy having an excellent thermal conductivity is preferably used as the metal material. The thermal conductivity coefficient of the vectra material is about 100 times smaller than that of the magnesium alloy. Thus, the hybrid blade 30 is constructed by combining the first blade portion 31 having a low thermal conductivity coefficient provided with the objective lens 33 and the second blade portion 32 having a high thermal conductivity coefficient provided with the driving coils 39.

Figure 5:
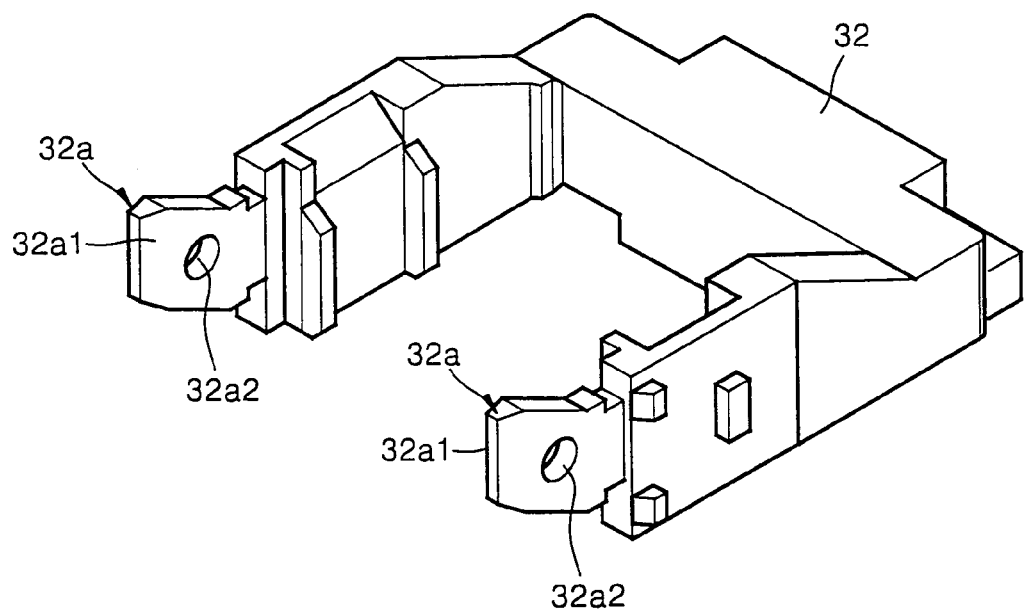
FIG. 5 is a view showing a second blade included in the blade shown in FIG. 4.

An insert molding method is used to integrally combine the first blade portion 31 with the second blade portion 32. Firstly, the second blade portion 32 having a shape as shown in FIG. 5, is manufactured using the magnesium alloy. Then the manufactured second blade portion 32 is inserted into an injection die having the shape of the blade 30. Sequentially, the reinforced plastics is injected into the injection die and the injection molding of the injection die is carried out, thereby obtaining the blade 30 as shown in FIG. 4. Thus, the first blade portion 31 is integrally adhered to the second blade portion 32, which is made prior to the first blade portion 31. The second blade portion 32 has a combining unit 32a to improve the combination with the first blade 31 after injection molding. That is, as shown in FIG. 5, the combining unit 32a has a protrusion 32a1 extending from the second blade portion 32 toward the first blade portion 31, and a combining hole 32a2 which is formed in the protrusion 32a1 and is filled with the reinforced plastics during the injecting molding. The inside of the combining hole 32a2 as well as the inner surface of the protrusion 32a1 are filled with the reinforced plastics during the injecting molding, and the blade 30 is solidified in a shape as shown in FIG. 4. Thus, the connection between the first blade portion 31 and the second blade portion 32 can be kept firm in spite of any external forces. The protrusion 32a1 is formed in a complex shape having a slope portion and a step portion in order to increase a reaction force against any external forces in all directions after combining the first and second blades portions 31 and 32 by injection molding.

Figure 7:
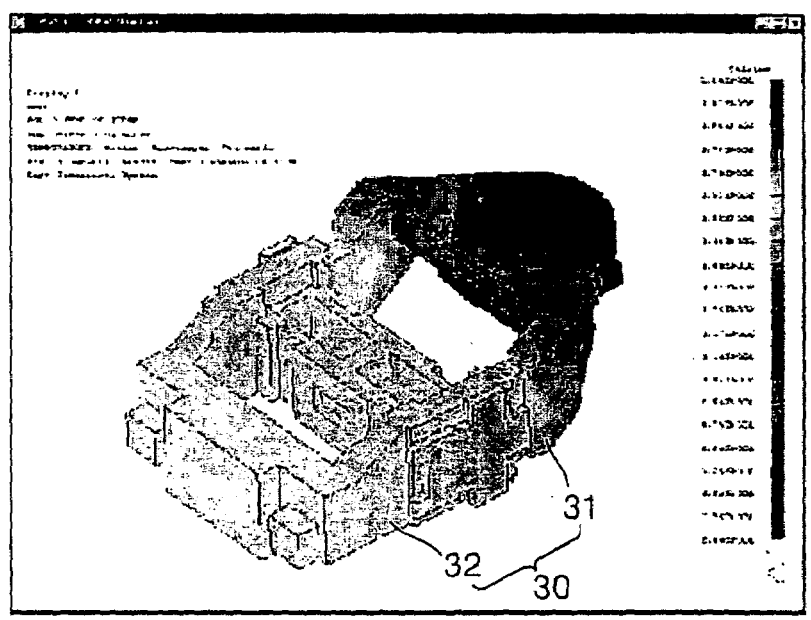
FIG. 7 shows a temperature distribution formed in the blade when driving the optical pickup device shown in FIG. 3.
Figure 8:
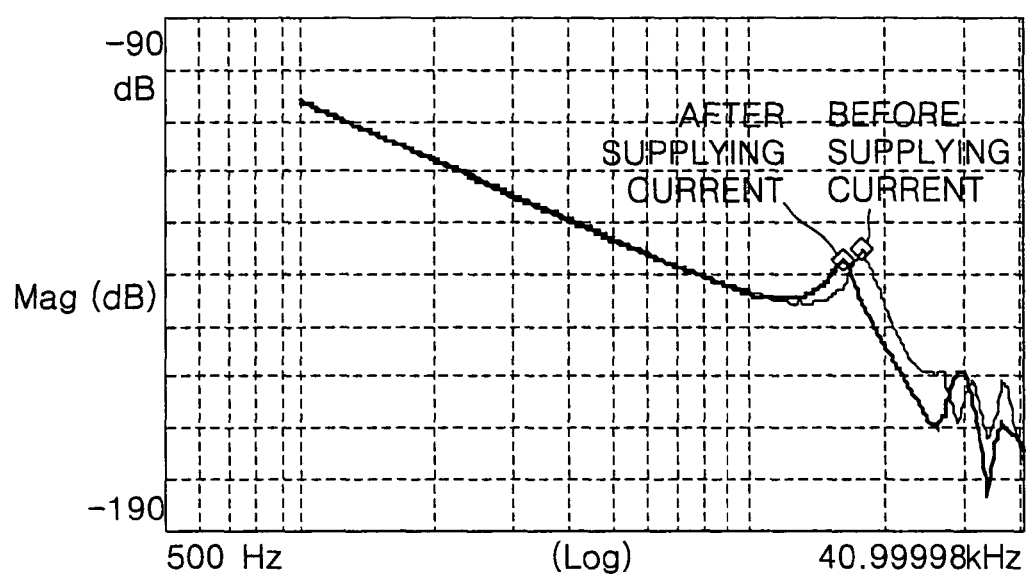
FIG. 8 is a graph showing changes in a second resonant frequency mode before and after driving the optical pickup device shown in FIG. 3.

When the optical pickup device adopting the blade 30 having the above structure is driven, a temperature distribution as shown in FIG. 7 occurs in the blade 30. As shown in FIG. 7, the temperature in the first blade portion 31 in which the objective lens 33 is mounted is not very high, but the temperature in the second blade portion 32 in which the driving coils 39 are mounted is relatively high. However, the second blade portion 32 does not overheat very much. Such a temperature distribution occurs due to the following reason. The heat generated in the driving coils 39 is rapidly transferred to the second blade portion 32 having the high thermal conductivity coefficient, and simultaneously the heat is easily radiated to the outside. That is, the second blade portion 32 made of the magnesium alloy functions as a radiator plate to receive the heat generated in the driving coils 39 to easily radiate the heat to the outside. By using the second blade portion 32 as presented above, problems such as damage to the driving coils 39 or rigidity reduction of the blade 30 can be avoided. FIG. 8 shows a change in a second resonant frequency before and after supplying an excessive current to the driving coils 39 of the above optical pickup device. It can be seen from FIG. 8 that the second resonant frequency is almost the same before and after supplying the excessive current. This means that the rigidity of the blade 30 is almost the same before and after supplying the excessive current. Further, since the first blade portion 31 made of the vectra material is connected to the second blade portion 32 and the thermal conductivity coefficient of the first blade 31 is only about $1/100$ of that of the second blade portion 32, the thermal conductivity speed of the first blade portion 31 is slower than the heat radiating speed of the second blade portion 32. Thus, the temperature around the objective lens 33 of the first blade portion 31 does not rise much, if at all.

Accordingly, since the first blade portion 31 having the low thermal conductivity coefficient blocks the heat from being transferred to the objective lens 33, and the second blade portion 32 having the high thermal conductivity coefficient rapidly radiates the heat generated in the driving coils 39 to the ambient air, the heat distortion of the objective lens 33 can be suppressed, and damage to the driving coils 39 or rigidity reduction of the blade 30 can be prevented.

As described above, the optical pickup device according to the present invention has the following and/or other advantages.

Firstly, since the objective lens is installed in the first blade having a low thermal conductivity coefficient and is thermally separated from the driving coil, the heat distortion of the objective lens can be prevented.

Secondly, since the driving coil is installed in the second blade having a high thermal conductivity coefficient, the heat radiation is rapidly processed and damage to the coil or rigidity reduction of the blade can be prevented.

Thirdly, since the heat generated in the optical pickup device is efficiently radiated without adding a separate cooling device, a small-sized and light-weight optical pickup device can be provided.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup device comprising:
a blade in which an objective lens is mounted;
a plurality of wires to elastically and movably support the blade with respect to a holder formed on a base;
driving coils installed in or on the blade and forming an electrical path to drive the objective lens along a focusing direction and a tracking direction; and
a magnet which is installed in the base and generates an electromagnetic force due to currents flowing through the driving coils to move the objective lens;
wherein:
the blade includes a first blade portion made of a reinforced plastics material in which the objective lens is mounted, and a second blade portion made of a magnesium alloy material in which the driving coils are mounted,
a thermal conductivity coefficient of the first blade portion is lower than a thermal conductivity of the second blade portion, and
the first blade portion is combined with a combining unit included in the second blade portion by mounting the second blade portion in a die, and injecting the die with the reinforced plastics material.

2. The optical pickup device of claim 1, wherein the combining unit has a protrusion extending from the second blade portion toward the first blade portion, and a combining hole formed in the protrusion to be filled with the reinforced plastics material.

3. An optical pickup device comprising:
a holder; and
a blade comprising:
a first blade portion in which an objective lens is positioned and made of a reinforced plastics material, and
a second blade portion having driving coils mounted thereon and made of a magnesium alloy material, wherein a thermal conductivity coefficient of the first blade portion is lower than that of the second blade portion; and
a combining unit positioned at each of two ends of the second blade portion to integrally hold the first blade portion thereto.

4. The optical pickup of claim 3, wherein the combining unit comprises:
a protrusion extending from the second blade portion towards the first blade portion; and
a combining hole formed in the protrusion in which the first blade portion engages to be integrally held by the second blade portion.

5. An optical pickup device having an objective lens and driving coils, the optical pickup device comprising:
a holder; and
a hybrid-type blade movable with respect to the holder and integrally combining a first blade portion which supports and thermally insulates the objective lens and a second blade portion which supports and radiates heat from the driving coils, the first blade portion made of a reinforced plastic material and the second blade portion made of a metal having a higher thermal conductivity than the first blade portion;
wherein the second blade portion comprises a stepped protrusion and the first blade portion is combined to the second blade portion by enclosing the stepped protrusion within the first blade portion.

6. The optical pickup device of claim 5, wherein the first and second blade portions are combined by molding the first blade portion onto the second blade portion.

7. An optical pickup device having an objective lens and driving coils, the optical pickup device comprising:
a holder; and
a hybrid-type blade movable with respect to the holder and integrally combining a first blade portion which supports and thermally insulates the objective lens and a second blade portion which supports and radiates heat from the driving coils, the first blade portion made of a reinforced plastic material and the second blade portion made of a metal having a higher thermal conductivity than the first blade portion;
wherein the second blade portion comprises a protrusion having a cross hole and the first blade portion is combined to the second blade portion by engaging the first blade portion in the cross hole.

8. The optical pickup device of claim 7, wherein the first and second blade portions are combined by molding a portion of the first blade portion into the cross hole.

* * * * *